United States Patent
Jung

(10) Patent No.: US 7,561,292 B2
(45) Date of Patent: Jul. 14, 2009

(54) NETWORK SCANNER AND METHOD OF ORGANIZING AND MAINTAINING NETWORK SCANNING SYSTEM

(75) Inventor: Joo-Young Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 953 days.

(21) Appl. No.: 11/001,321

(22) Filed: Dec. 2, 2004

(65) Prior Publication Data

US 2005/0141041 A1   Jun. 30, 2005

(30) Foreign Application Priority Data

Dec. 3, 2003   (KR) .................. 10-2003-0087252

(51) Int. Cl.
*G06F 15/00* (2006.01)
(52) U.S. Cl. .................. 358/1.15; 358/402; 709/245
(58) Field of Classification Search ............. 358/1.15, 358/402, 1.6, 1.16; 709/220, 238, 242, 245
See application file for complete search history.

(56) References Cited

U.S. PATENT DOCUMENTS

| 6,223,223 | B1 | 4/2001 | Kumpf et al. .............. 709/227 |
| 6,880,019 | B1 * | 4/2005 | Toyoda ...................... 709/238 |
| 7,065,563 | B2 * | 6/2006 | Islam et al. ................ 709/220 |
| 7,124,201 | B2 * | 10/2006 | Iyoki ........................ 709/245 |
| 2001/0021037 | A1 * | 9/2001 | Itoh .......................... 358/1.15 |
| 2001/0039590 | A1 | 11/2001 | Furukawa et al. ........... 709/238 |
| 2002/0107983 | A1 * | 8/2002 | Iyoki ......................... 709/245 |
| 2003/0135590 | A1 * | 7/2003 | Rezaul Islam et al. ....... 709/220 |
| 2004/0105104 | A1 * | 6/2004 | Ishikawa et al. .............. 358/1.6 |
| 2006/0101520 | A1 * | 5/2006 | Schumaker et al. ........... 726/25 |
| 2007/0211310 | A1 * | 9/2007 | Kadota ....................... 358/474 |
| 2008/0009266 | A1 * | 1/2008 | Yamasaki et al. ........... 455/411 |

FOREIGN PATENT DOCUMENTS

| JP | 11-053143 | 2/1999 |
| JP | 11-219271 | 8/1999 |
| JP | 2002-123380 | 4/2002 |
| KR | 2003-52008 | 6/2003 |

OTHER PUBLICATIONS

Korean Office Action Oct. 24, 2005 with English Translation.

* cited by examiner

*Primary Examiner*—Kimberly A Williams
(74) *Attorney, Agent, or Firm*—Roylance, Abrams, Berdo & Goodman

(57) ABSTRACT

Provided are a network scanner and a method of organizing and maintaining a network scanning system, which makes a list of users who are currently connected to the network scanner and automatically maintains the users connections to the network scanner even when an Internet protocol (IP) address of the network scanner changes. The method involves (a) enabling the computer to transmit user information to the network scanner, the user information being input by a user of the computer with the use of a client program installed in the computer; (b) enabling the network scanner to receive the user information from the client program; and (c) enabling the network scanner to make a user list by using the received user information.

16 Claims, 8 Drawing Sheets

NETWORK SCANNER AND METHOD OF ORGANIZING AND MAINTAINING NETWORK SCANNING SYSTEM

CROSS-REFERENCE TO RELATED APPLICATION

This application claims the benefit under 35 U.S.C. §119 (a) of Korean Patent Application No. 2003-87252, filed on Dec. 3, 2003, in the Korean Intellectual Property Office, the entire disclosure of which is incorporated herein in its entirety by reference.

BACKGROUND OF THE INVENTION

1. Field of the Invention

The present invention relates to a network scanner. More particularly, the present invention relates to a network scanner and a method of organizing and maintaining a network scanning system, which makes a list of users who are currently connected to the network scanner and automatically maintains the users connections to the network scanner even when an Internet protocol (IP) address of the network scanner changes.

2. Description of the Related Art

In generally, a scanner or a multifunctional device, into which a scanner, a photocopier, and a printer are integrated, is connected to a plurality of computers so that it can be shared by the plurality of computers. In order to scan a document using a conventional scanner, a network scanning system used to be organized by installing an additional data storage server in the conventional scanner. This type of conventional network scanning system has been disclosed in U.S. Pat. No. 6,223,223.

FIG. 1 is a block diagram of a conventional network scanning system. Referring to FIG. 1, a scanner 100 is connected to a server 300, and the server 300 is connected to a computer 200, thereby forming a network. For the sake of convenience, only one scanner and only one computer are illustrated in FIG. 1. However, a plurality of scanners and a plurality of computers may be connected to one another via the server 300 to form a network. Users register their accounts with the server 300 in advance so that a list of the users can be registered with and stored in the server 300.

In order for a user to scan a document, the user should log on to the scanner 100 using his/her registered ID. Once the document is successfully scanned, the scanned data is stored in the user's account registered with the server 300. The user accesses the server 300 again using his/her computer, searches for the scanned data, and makes a copy of the scanned data into his/her computer, thereby completing the entire scanning process. This type of scanning process, however, has the following disadvantages. First, since many users share the scanner 100, they have to go to the scanner 100 to check whether the scanner 100 is available. Second, if one of the users goes to the scanner 100 to scan a document and realizes that another user is currently scanning a document using the scanner 100, he/she has to wait near the scanner 100 until another user completes his/her current scanning process or has to leave the scanner 100 for a moment and go back to the scanner 100 after a while, which is inconvenient and wastes time. Third, after completing the scanning process, a user has to re-access the server 300 with his/her computer, which is also inconvenient. Fourth, it costs a lot of money to assemble the conventional network system because the conventional network system requires an additional storage device, such as, the server 300. Finally, in the case where information on the scanner 100 has changed, a user may not be able to instantly know about the change(s). In particular, in a case where an IP address of the scanner 100 has changed, the user may not be able to access the server 300. Thus, the user cannot make a copy of scanned data stored in the server 300 into his/her computer.

Accordingly, there exists a need for a network scanner that automatically maintains the users' connections to the network scanner even when an Internet protocol (IP) address of the network scanner changes.

SUMMARY OF THE INVENTION

The present invention provides a method of organizing and maintaining a network scanning system, which makes a list of users who are currently connected to the network scanner, and automatically maintains the users' connections to the network scanner even when an Internet protocol (IP) address of the network scanner changes.

The present invention also provides a network scanner, which makes a list of users who are currently connected to the network scanner, and automatically maintains the users' connections to the network scanner even when an Internet protocol (IP) address of the network scanner changes.

According to an aspect of the present invention, there is provided a method of organizing and maintaining a network scanning system that includes a network scanner connected to a computer. The method involves (a) enabling the computer to transmit user information to the network scanner, the user information being input by a user of the computer with the use of a client program installed in the computer; (b) enabling the network scanner to receive the user information from the client program; and (c) enabling the network scanner to make a user list by using the received user information.

The method may further involve (d) enabling the network scanner to transmit scanner information to the client program; and (e) enabling the client program to make a scanner list by using the received scanner information.

According to another aspect of the present invention, there is provided a network scanner that is connected to a computer, in which a client program is installed. The network scanner includes a user information receipt unit, which receives user information, which is input by the user of the computer with the use of a client program, from the client program; and a user list making unit, which makes a user list by using the user information.

The network scanner may further include a scanner information transmission unit, which transmits scanner information to the client program. The client program makes a scanner list by using the scanner information.

BRIEF DESCRIPTION OF THE DRAWINGS

The above and other features and advantages of the present invention will become more apparent by describing in detail exemplary embodiments thereof with reference to the attached drawings in which.

Like reference numbers are used to refer to like features and structures throughout the drawings.

DETAILED DESCRIPTION OF THE EXEMPLARY EMBODIMENTS

The present invention will now be described more fully with reference to the accompanying drawings, in which preferred embodiments of the invention are shown. Detailed explanations of conventional technical features related to the present invention may be omitted for the sake of conciseness. Terms used in this disclosure may have different meanings from their conventional meanings depending on, for example, by whom and with what intentions they are used, and thus they should be defined within the scope of the present invention.

Figure 1:
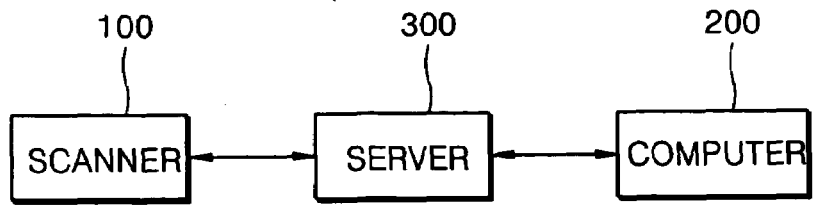
FIG. 1 is a block diagram of a conventional network scanning system.
Figure 2:
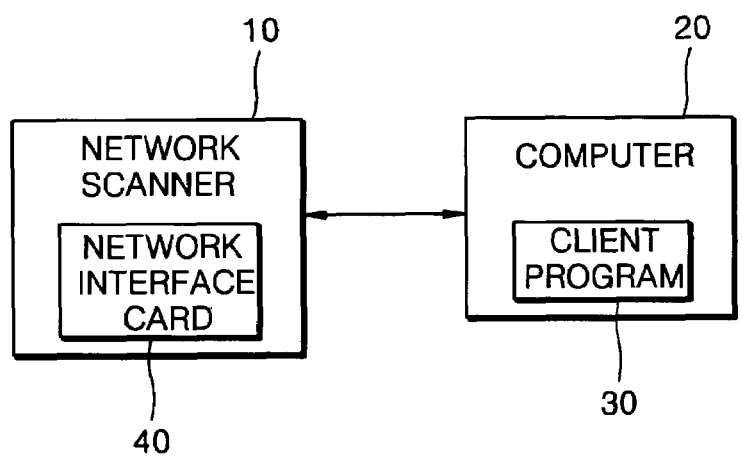
FIG. 2 is a block diagram of a network scanning system according to a preferred embodiment of the present invention.

FIG. 2 is a block diagram of a network scanning system according to a preferred embodiment of the present invention. Referring to FIG. 2, a network scanner 10 is directly connected to a computer 20. In order to directly connect the network scanner 10 to the computer 20 without the help of any server, the network scanner 10 includes a network interface card 40. The computer 20 includes a client program 30, which enables the computer 20 to use the network scanner 10.

Figure 3:
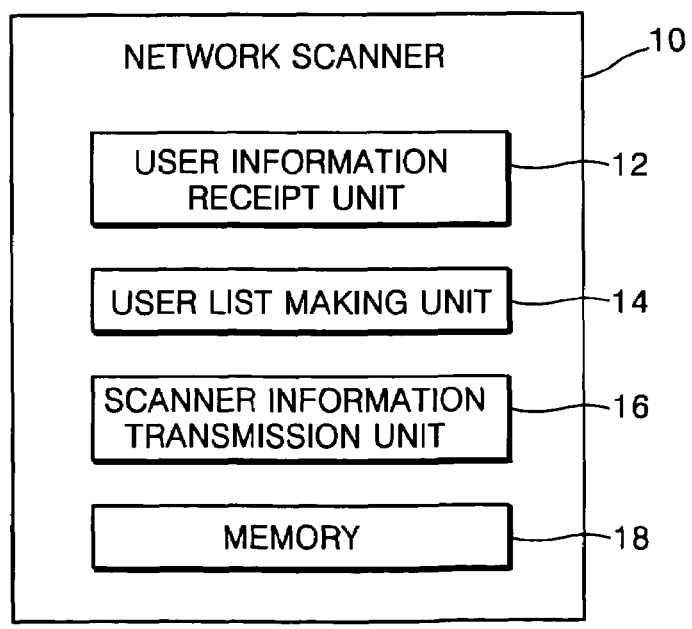
FIG. 3 is a block diagram of a network scanner according to a preferred embodiment of the present invention.

FIG. 3 is a block diagram of a network scanner 10 according to a preferred embodiment of the present invention. Referring to FIG. 3, the network scanner 10 includes a user information receipt unit 12, a user list making unit 14, a scanner information transmission unit 16, and a memory 18. The user information receipt unit 12 receives user information, which is input by a user using the computer's client program, from the client program. The user list making unit 14 makes a user list using the user information. The scanner information transmission unit 16 transmits scanner information to the client program, and the client program makes a scanner list by using the scanner information. The memory 18 stores the user list. When the network scanner 10 is turned off, the user list stored in the memory 18 is preferably deleted. However, if the network scanner 10 is turned on again, it may form a new user list. The network scanner 10 may dynamically form a user list.

FIGS. 4A through 4G are diagrams illustrating various packets transmitted between the network scanner 10 and the computer 20 according to embodiments of the present invention.

Figure 4A:
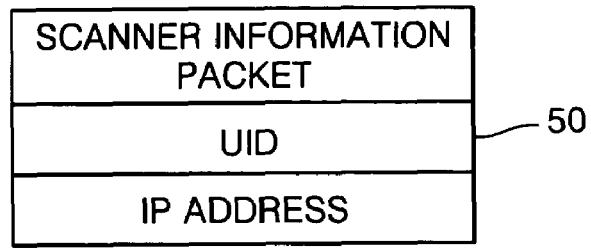
FIG. 4A is a diagram illustrating a scanner information packet according to an embodiment of the present invention.

FIG. 4A illustrates a scanner information packet 50 according to an embodiment of the present invention. Referring to FIG. 4A, the scanner information packet 50 is a packet that specifies information on the capability of the network scanner 10 and includes the 'unique identification (UID)' and the 'Internet protocol (IP) address' of the network scanner 10. The 'UID' indicates a unique identification of the network scanner 10 that never changes so that it can be distinguished from other network scanners. The 'UID' may be a media access control (MAC) address of the network interface card 40 of the network scanner 10. The 'IP address' indicates an IP address of the network scanner 10. Even though the scanner information packet 50 is illustrated in FIG. 4A as having only a few pieces of information in the drawing for the sake of convenience, the scanner information packet 50 may include more or less information than that set forth herein. For example, the scanner information packet 50 may further include information on the resolutions and data compression methods supported by the network scanner 10. The scanner information packet 50 is transmitted from the network scanner 10 to the client program 30.

Figure 4B:
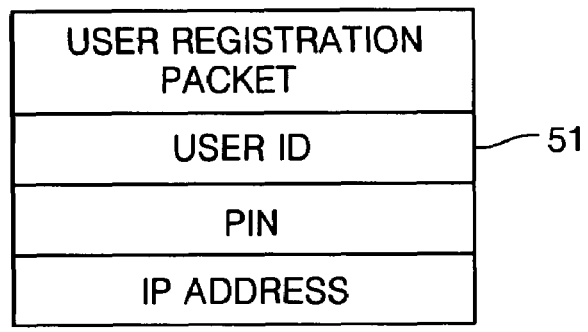
FIG. 4B is a diagram illustrating a user registration packet according to an embodiment of the present invention.

FIG. 4B illustrates a user registration packet 51 according to an embodiment of the present invention. Referring to FIG. 4B, the user registration packet 51 includes values for a 'user ID', a 'personal identification number (PIN)', and an 'IP address'. The 'User ID' indicates an ID of a user of a computer. The 'PIN' indicates a PIN designated by the user, and the 'IP address' is the IP address of the computer. The user registration packet 51 is transmitted from the client program 30 to the network scanner 10.

Figure 4C:
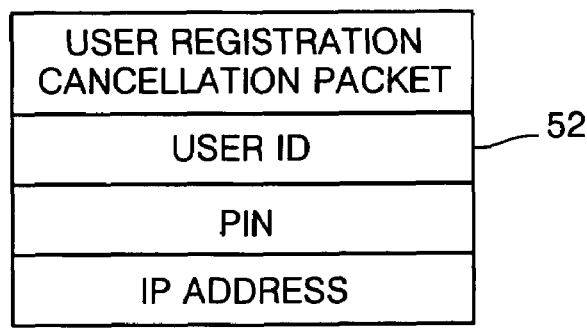
FIG. 4C is a diagram illustrating a user registration cancellation packet according to an embodiment of the present invention.

FIG. 4C illustrates a user registration cancellation packet 52 according to an embodiment of the present invention. Referring to FIG. 4C, the user registration cancellation packet 52, like the user registration packet 51 of FIG. 4B, includes values for a 'user ID', a 'PIN', and an 'IP address'. The user registration cancellation packet 52 is also preferably transmitted from the client program 30 to the network scanner 10.

Figure 4D:
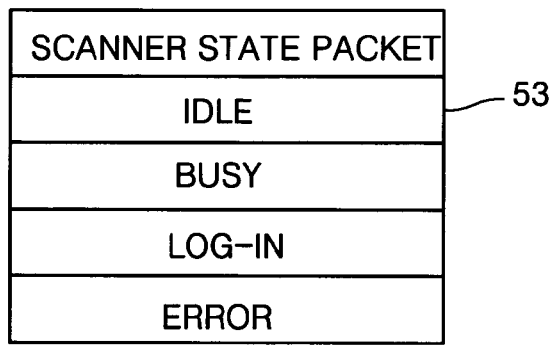
FIG. 4D is a diagram illustrating a scanner state packet according to an embodiment of the present invention.

FIG. 4D illustrates a scanner state packet 53 according to an embodiment of the present invention. Referring to FIG. 4D, the scanner state packet 53 includes values for an 'idle', a 'busy', a 'log-in', and an 'error'. 'Idle' indicates a value indicating that the network scanner 10 is currently available. 'Busy' indicates a value indicating that the network scanner 10 is currently busy performing a scanning process. 'Log-in' indicates a value indicating that a user has logged on to the network scanner 10. 'Error' indicates that an error, such as a paper jam, has occurred in the network scanner 10. The scanner state packet 53 is transmitted from the network scanner 10 to the client program 30.

Figure 4E:
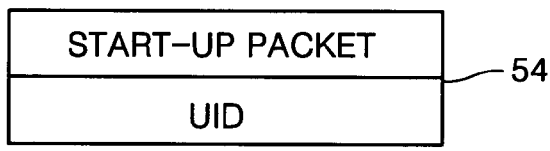
FIG. 4E is a diagram illustrating a start-up packet according to an embodiment of the present invention.

FIG. 4E illustrates a start-up packet 54 according to an embodiment of the present invention. Referring to FIG. 4E, the start-up packet 54 includes a 'UID' value. When the network scanner 10 is turned on, it broadcasts the start-up packet 54 to the client program 30. Therefore, the start-up packet 54 is transmitted from the network scanner 10 to the client program 30.

Figure 4F:
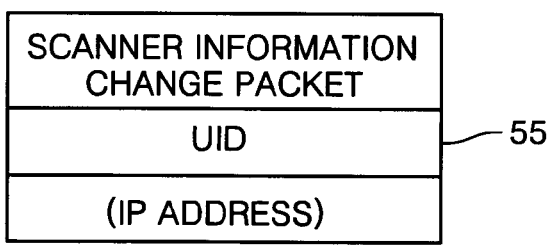
FIG. 4F is a diagram illustrating a scanner information change packet according to an embodiment of the present invention.

FIG. 4F illustrates a scanner information change packet 55 according to an embodiment of the present invention. Referring to FIG. 4F, the scanner information change packet 55 includes a 'UID' value. The scanner information change packet 55 may selectively include other scanner information. In FIG. 4F, the 'IP address' is parenthesized because the scanner information change packet 55 may or may not include the 'IP address'. The scanner information change packet 55 may include changed scanner information. In other words, in a case where an IP address of the network scanner 10 has changed, the scanner information change packet 55 may include a new IP address of the network scanner 10. Other scanner information that may be included in the scanner information packet 50 of FIG. 4A may also be included in the scanner information change packet 55. The scanner information change packet 55 is transmitted from the network scanner 10 to the client program 30.

Figure 4G:
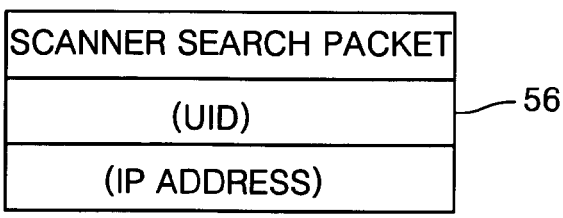
FIG. 4G is a diagram illustrating a scanner search packet according to an embodiment of the present invention.

FIG. 4G illustrates a scanner search packet 56 according to an embodiment of the present invention. Referring to FIG. 4G, the scanner search packet 56 may include a 'UID' or an 'IP address'. In other words, if a user puts desired requirements in the scanner search packet 56 and transmits the scanner search packet 56 to scanners, some of the scanners that meet all of the desired requirements may respond to the user. In order to search for all scanners in the network scanning system, the user transmits the scanner search packet 56 to all of the scanners without putting any information in the scanner search packet 56. For example, if the scanner search packet 56 includes a predetermined UID, a scanner having the predetermined UID may respond to the user. Other scanner information that may be included in the scanner information packet 50 may also be included in the scanner search packet 56. The scanner search packet 56 is transmitted from the client program 30 to the network scanner 10.

Figure 5:
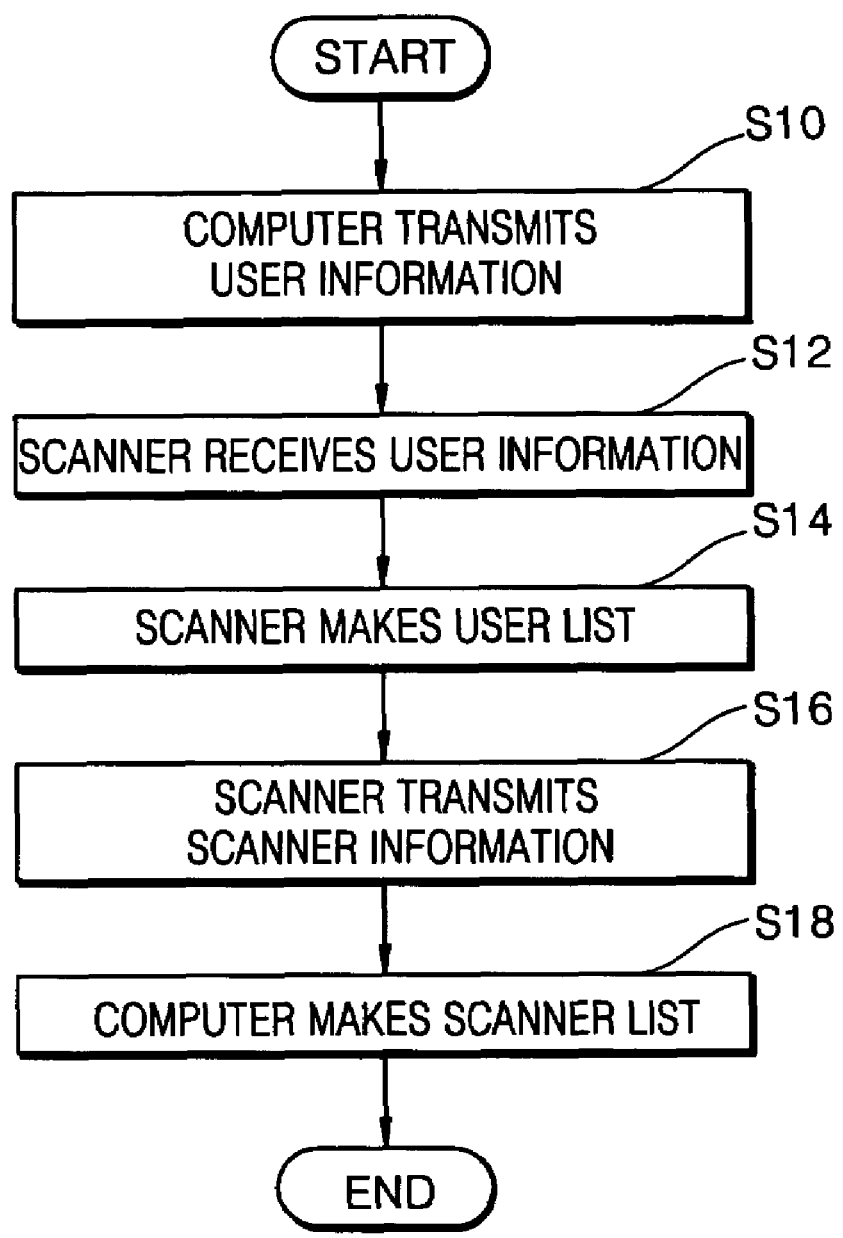
FIG. 5 is a flowchart of a method of organizing and maintaining a network scanning system according to a preferred embodiment of the present invention.

FIG. 5 is a flowchart of a method of organizing and maintaining a network scanning system according to a preferred embodiment of the present invention. Referring to FIG. 5, a computer transmits user information that is input by a user of the computer with the use of a client program of the computer to a network scanner in step S10. The scanner receives the user information from the client program in step S12. The scanner makes a user list using the received user information in step S14. The scanner transmits scanner information to the client program in step S16. The client program makes a scanner list using the received scanner information in step S118.

The network scanner may determine whether the scanner information has changed and may transmit a change (or changes), if any, made to the scanner information to the client program in real time. Preferably, the scanner information includes a UID and IP address of the network scanner. The UID of the network scanner may be a MAC address of a network interface card included in the network scanner. The user information may include a user's UID, PIN, and IP address.

The network scanner 10 may store the user list in a memory thereof. When the network scanner 10 is turned off, the user list stored in the memory is deleted.

Figure 6:
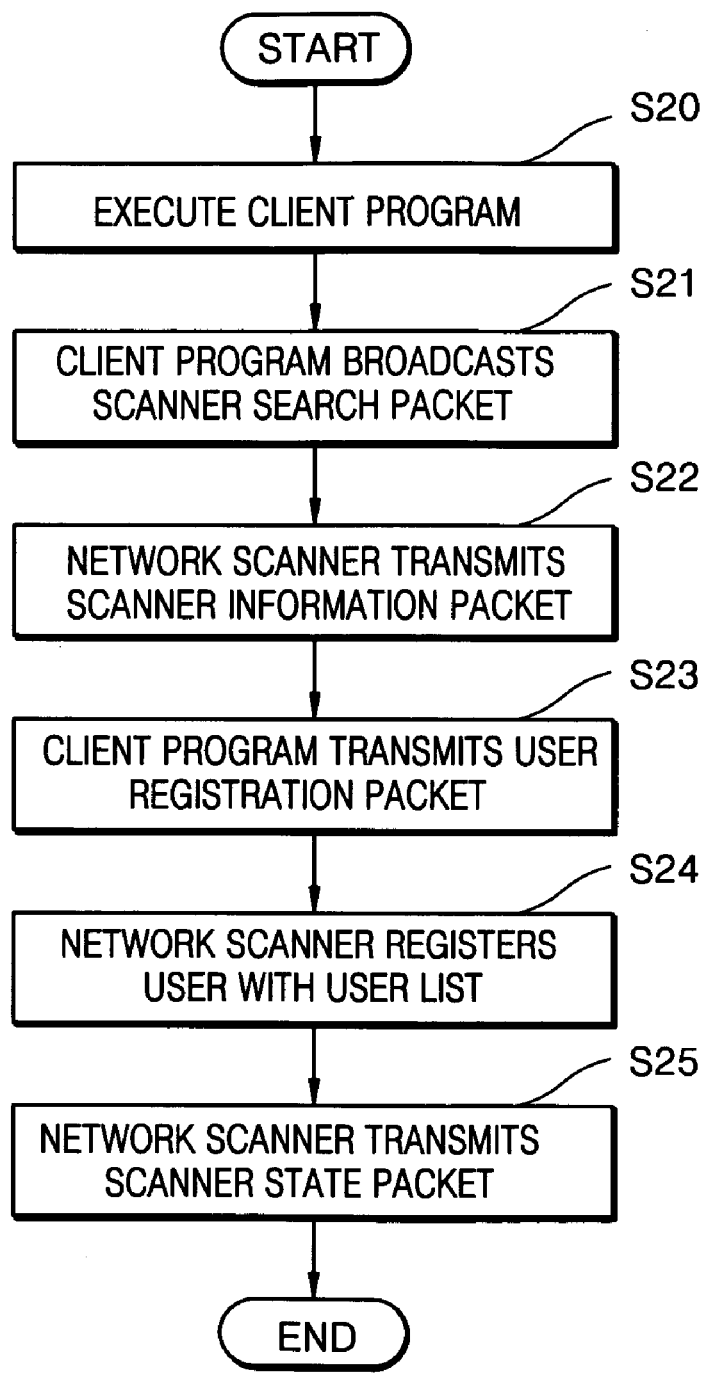
FIG. 6 is a flowchart of a method of organizing a list of users according to an embodiment of the present invention.

FIG. 6 is a flowchart of a method of making a user list with the use of a network scanner according to an embodiment of the present invention. Referring to FIG. 6, a user of a computer executes a client program of the computer in step S20. In step S21, the client program broadcasts a scanner search packet. If the client program does not have any knowledge of a UID of a scanner of interest connected to the computer, the UID of the network scanner of interest is not included in the scanner search packet, in which case, all scanners connected to the computer transmit their own scanner information packets to the computer. If the client program knows of the UID of the scanner of interest, the UID of the scanner of interest is included in the scanner search packet, and then the scanner of interest transmits its own scanner information packet to the client program in step S22.

The client program makes a scanner list by using the scanner information included in the scanner information packet(s) input thereinto. Since all of the scanners connected to the computer have different UIDs, the client program can easily find out whether the IP addresses of the scanners have changed based on the UIDs of the scanners. If the IP addresses of some of the scanners have changed, the client program updates the scanner list by using the changed IP addresses.

In step S23, the client program transmits a user registration packet including the user information of the computer user to the scanner of interest. In steps S24, the scanner of interest registers the user with the user list by using the user information included in the user registration packet input thereto. In step S25, the scanner of interest transmits a scanner state packet to the client program so that the client program can be notified of the current state of the scanner of interest.

Figure 7:
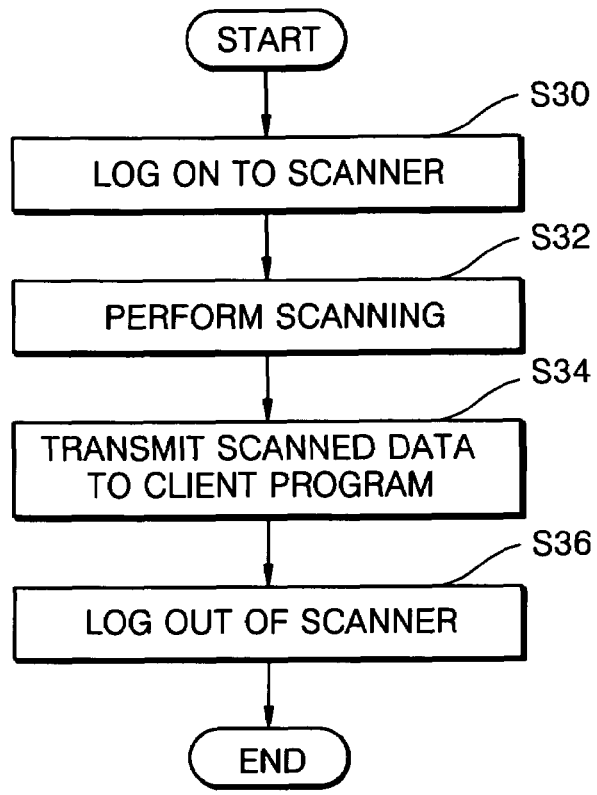
FIG. 7 is a flowchart of a method of scanning a document according to an embodiment of the present invention.

FIG. 7 is a flowchart of a method of scanning a document according to an embodiment of the present invention. Referring to FIG. 7, a user checks whether a predetermined scanner is currently available by referring to a scanner state packet received from the predetermined scanner and goes over to the predetermined scanner, if the predetermined scanner is available. The user logs on to the predetermined scanner by inputting his/her user ID and PIN in step S30. The scanner notifies all computers connected thereto that the user is currently logged on thereto by updating the scanner state packet and transmitting the updated scanner state packet to each of the computers connected thereto.

In step S32, the user scans a document using the predetermined scanner, and the scanner notifies all of the computers connected thereto that it is currently performing a scanning process by updating the scanner state packet and transmitting the updated scanner state packet to each of the computers connected thereto.

In step S34, scanned data is preferably transmitted to a client program either during the scanning process or after the scanning process is completed. The scanned data is not stored in the predetermined scanner but transmitted to the client program, which is important. Therefore, there is no need for the user to go back to his/her computer and access the scanner with the use of the computer to obtain the scanned data after the scanning process is completed.

After the scanning process is completed, the user logs out of the predetermined scanner in step S36. Then, the predetermined scanner notifies all of the computers connected thereto that the user is logged out by updating the scanner state packet and transmitting the updated scanner state packet to all of the computers connected thereto.

Figure 8:
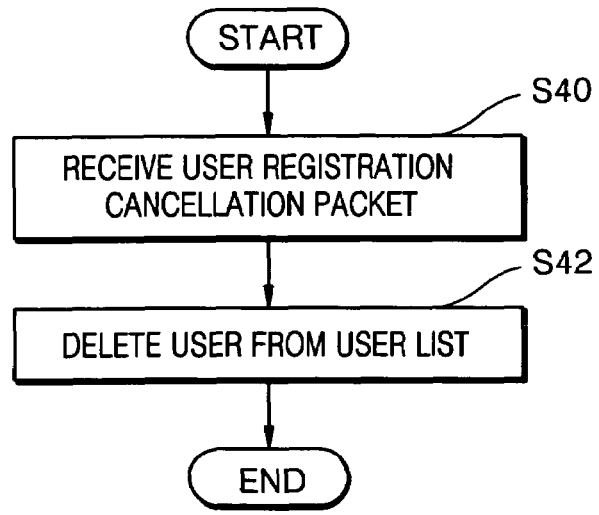
FIG. 8 is a flowchart of a method of deleting a user from a user list by receiving a user registration cancellation packet from the user according to an embodiment of the present invention.

A method of ending a client program or cancelling a user's registration with a scanner will now be described more fully with reference to FIG. 8. FIG. 8 is a flowchart of a method of receiving a user registration cancellation packet according to an embodiment of the present invention. In the case of ending a client program or cancelling a user's registration with a scanner, the client program transmits a user registration cancellation packet to the scanner before it is ended. If the scanner receives the user registration cancellation packet from the client program in step S40, it deletes the user corresponding to the user ID included in the received user registration cancellation packet from a user list in step S42.

Even in a case where the client program fails to transmit the user registration cancellation packet to the scanner before it is ended, the user may need to be deleted from the user list. In this case, the client program is made to periodically transmit a user registration packet to the scanner, and the scanner is made to periodically check whether the user registration packet is periodically transmitted from the client program. If the client program fails to periodically transmit the user registration packet to the scanner, the scanner deletes the user from the user list.

Figure 9:
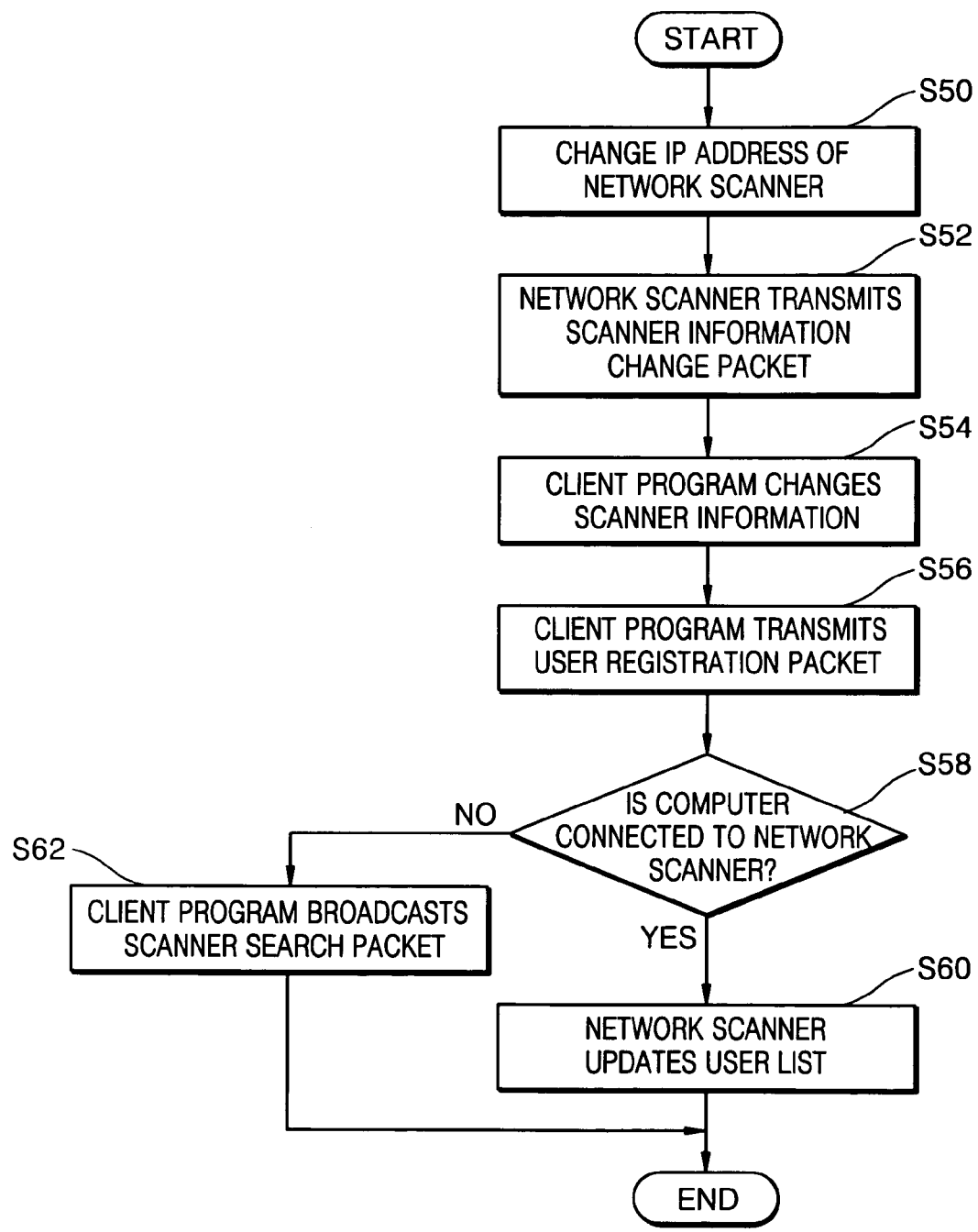
FIG. 9 is a flowchart illustrating a method of updating an IP address of a scanner in a case where the IP address of the scanner has changed according to an embodiment of the present invention.

FIG. 9 is a flowchart illustrating a method of updating an IP address of a scanner in a case where the IP address of the scanner has changed according to an embodiment of the present invention. Referring to FIG. 9, if an IP address of a scanner has changed in step S50, a scanner information change packet including a new IP address of the scanner is transmitted to a computer's client program in step S52. In step S54, the client program changes scanner information of the scanner, for instance, the IP address of the scanner, in a scanner list by referring to a UID included in the received scanner information change packet. In step S56, the client program transmits a user registration packet by using a new IP address of the scanner.

In step S58, it is determined whether the computer is connected to the scanner. If the computer is connected to the scanner, the scanner updates a user list in step S60 and transmits a scanner state packet to the client program. When receiving the scanner state packet from the scanner, the client program recognizes that it has successfully accessed the scanner. If the client program fails to access the scanner, it broadcasts a scanner search packet by referring to the UID of the scanner as in step S62. The scanner transmits a scanner information packet to the client program in response to the scanner search packet so that the client program can attempt to access the scanner once again by referring to the scanner information packet received from the scanner.

If the scanner is turned off, the client program does not receive any response from the scanner, in which case, the client program recognizes that its connection to the scanner is cut off. If the scanner is turned on after a while, it broadcasts a start-up packet including its UID. The client program broadcasts the scanner search packet to the scanner by referring the UID of the scanner, and the scanner transmits the scanner information packet to the client program, thereby automatically updating the IP address of the scanner.

As described above, it is possible to update an IP address of a scanner by referring to the UID of the scanner, even when the IP address of the scanner has changed.

Figure 10:
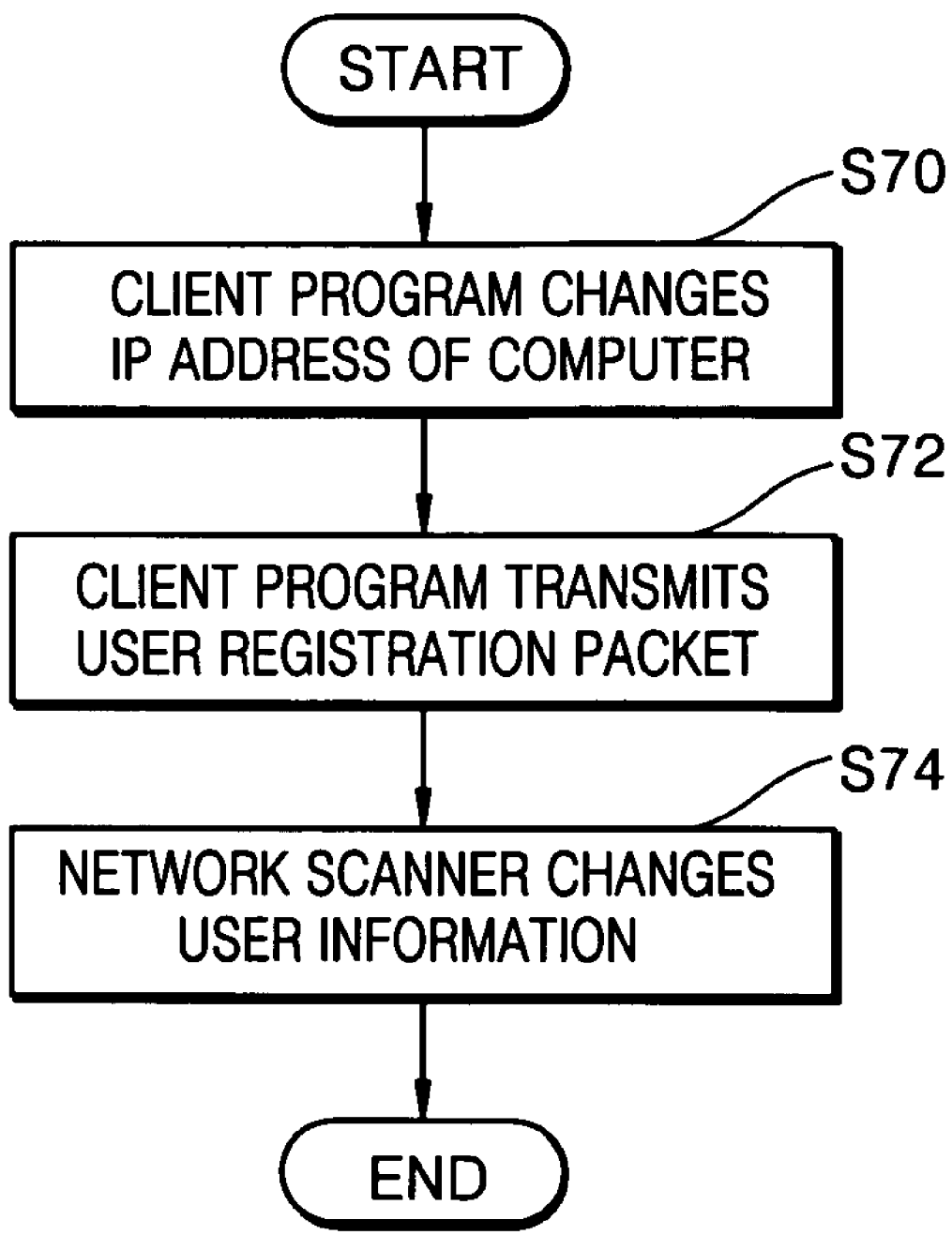
FIG. 10 is a flowchart of a method of updating an IP address of a computer in a case where the IP address of the computer has changed according to an embodiment of the present invention.

FIG. 10 is a flowchart illustrating a method of updating an IP address of a computer in a case where the IP address of the computer has changed according to an embodiment of the present invention. Referring to FIG. 10, if an IP address of a computer has changed in step S70, a client program of the computer transmits a user registration packet including a new IP address of the computer to a scanner in step S72. In step S74, the scanner changes the user information in the user list, such as, an IP address of the computer in the user list, by referring to a user ID included in the received user registration packet. The scanner may transmit a scanner state packet to the computer to notify the computer that the computer is connected thereto. Therefore, even when the IP address of the computer has changed, the scanner can automatically update the IP address of the computer by referring to the user ID.

The scanner preferably checks a PIN as well as the user ID to determine whether the IP address of the computer has changed. Accordingly, it is possible to prevent the IP address of the computer from being unnecessarily updated by users who have different IP addresses but use the same user ID to transmit the user registration packet to the scanner. Therefore, the scanner checks whether there is a perfect match in the user list between a user ID and PIN input by a user, who is currently attempting to access the scanner. If the user ID and PIN match, the corresponding IP address is updated. On the other hand, if the PIN input by the user does not match with the user ID registered on the user list, the user is notified that the user ID input by him/her is currently being used by someone else, and the corresponding IP address is not updated.

The preferred embodiments of the present invention have been described so far by taking a network scanner as an example of a device, to which the embodiments of the present invention are applicable. However, the embodiments of the present invention can also be applied to a network multifunctional device into which a scanner, a printer, and a photocopier are integrated.

As described above, according to embodiments of the present invention, there is no need to additionally provide a server in which scanned data is stored and with which user accounts are registered. Accordingly, it is possible to reduce the manufacturing costs of network scanning systems. In addition, the scanned data is directly transmitted from a scanner to a user's computer, and thus there is no need for the user to access the server.

Moreover, the user can check with his/her computer whether the scanner is available or busy performing a scanning process without going over to the scanner wasting time.

Furthermore, since in the embodiments of the present invention, user information and scanner information are automatically managed, it is possible to easily maintain and manage a network scanning system. Even if the IP address of the scanner changes, it is possible to automatically update scanner information by referring to a UID of the scanner. In addition, even if the IP address of the user's computer changes, it is possible to automatically update the user information by referring to the user's ID.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of organizing and maintaining a network scanning system that includes a network scanner connected to a computer, the method comprising:
   (a) enabling the computer to transmit user information to the network scanner, the user information being input by a user of the computer with the use of a client program installed in the computer;
   (b) enabling the network scanner to receive a user registration packet or a user registration cancelation packet each including the user information from the client program; and
   (c) enabling the network scanner to make and modify a user list including adding the user to the user list in response to the receipt of the user registration packet or deleting the user from the user list in response to the receipt of the user registration cancellation packet by using the received user information.

2. The method of claim 1 further comprising:
   (d) enabling the network scanner to transmit scanner information to the client program; and
   (e) enabling the client program to make a scanner list by using the received scanner information.

3. The method of claim 2, wherein step (d) comprises:
   enabling the network scanner to determine whether the scanner information has changed; and
   transmitting the changed scanner information to the client program in real time.

4. The method of claim 2, wherein the scanner information comprises a unique identification (UID) and an Internet protocol (IP) address of the network scanner.

5. The method of claim 4, wherein the UID of the network scanner comprises a media access control (MAC) address of a network interface card installed in the network scanner.

6. The method of claim 4, wherein step (e) comprises:
automatically managing the scanner list by, if the IP address of the network scanner changes, enabling the client program to receive the changed IP address from the network scanner with the use of the UID of the network scanner and updating the original IP address of the network scanner with the received IP address.

7. The method of claim 1, wherein the user information comprises a user's identification, personal identification number (PIN), and IP address.

8. The method of claim 7, wherein step (c) comprises:
automatically managing the user list by, if an IP address of the computer changes, enabling the network scanner to receive the changed IP address from the client program with the use of the user's identification and PIN and update the original IP address of the computer with the received IP address.

9. A network scanner that is connected to a computer, in which a client program is installed, the network scanner comprising:
a user information receipt unit for receiving a user registration packet or a user registration cancelation packet each including user information input by a user of the computer with the use of a client program, from the client program; and
a user list making unit for making a user list including adding the user to the user list in response to the receipt of the user registration packet or deleting the user from the user list in response to the receipt of the user registration cancellation packet.

10. The network scanner of claim 9 further comprising:
a scanner information transmission unit, which transmits scanner information to the client program,
wherein the client program makes a scanner list by using the scanner information.

11. The network scanner of claim 10, wherein the scanner information transmission unit determines whether the scanner information has changed and transmits the changed scanner information to the client program in real time.

12. The network scanner of claim 10, wherein the scanner information comprises a unique identification (UID) and an Internet protocol (IP) address of the network scanner.

13. The network scanner of claim 12, wherein the UID of the network scanner comprises a media access control (MAC) address of a network interface card installed in the network scanner.

14. The network scanner of claim 12, wherein if the IP address of the network scanner changes, the scanner information transmission unit transmits the changed IP address to the client program, and the client program automatically manages the scanner list by receiving the changed IP address from the network scanner with the use of the UID of the network scanner and updating the original IP address of the network scanner with the received IP address.

15. The network scanner of claim 9, wherein the user information comprises a user's identification, personal identification number (PIN), and IP address.

16. The network scanner of claim 15, wherein if an IP address of the computer changes, the user list making unit automatically manages the user list by receiving the changed IP address from the client program with the use of the user's ID and PIN and updating the original IP address of the network scanner with the received IP address.

* * * * *